United States Patent
Kimura et al.

(10) Patent No.: US 6,874,525 B2
(45) Date of Patent: Apr. 5, 2005

(54) LINEAR SOLENOID VALVE CONTROL DEVICE

(75) Inventors: Yusuke Kimura, Fuji (JP); Tatsuo Ochiai, Fuji (JP); Tateki Jozaki, Fuji (JP); Yoshinori Ishimori, Fuji (JP); Hideshi Wakayama, Fuji (JP)

(73) Assignee: Jatco, Ltd., Fuji (JP)

( * ) Notice: Subject to any disclaimer, the term of this patent is extended or adjusted under 35 U.S.C. 154(b) by 0 days.

(21) Appl. No.: 10/912,281

(22) Filed: Aug. 6, 2004

(65) Prior Publication Data

US 2005/0028866 A1 Feb. 10, 2005

(30) Foreign Application Priority Data

Aug. 7, 2003 (JP) ..................................... 2003-289159

(51) Int. Cl.[7] .............................................. F16K 51/00
(52) U.S. Cl. ..................................... 137/238; 137/246
(58) Field of Search ................................ 137/238–239, 137/246–246.14; 251/129.01–129.22

(56) References Cited

U.S. PATENT DOCUMENTS

| | | | | |
|---|---|---|---|---|
| 3,735,771 A | * | 5/1973 | Panissidi ................. | 137/15.04 |
| 4,281,678 A | * | 8/1981 | Claycomb .................. | 137/238 |
| 6,592,099 B2 | * | 7/2003 | Yamamoto et al. ..... | 251/129.04 |
| 6,655,404 B2 | * | 12/2003 | Hilaire ........................ | 137/86 |
| 6,729,601 B2 | * | 5/2004 | Freisinger et al. ..... | 251/129.05 |

FOREIGN PATENT DOCUMENTS

| JP | 2629512 B2 | 4/1997 |
|---|---|---|
| JP | 2836789 B2 | 10/1998 |

* cited by examiner

*Primary Examiner*—Paul J. Hirsch
(74) *Attorney, Agent, or Firm*—Foley & Lardner LLP (57) ABSTRACT

Disclosed is a control device for controlling a two-way linear solenoid valve (60) including a pressure regulating port (60p) which communicates with a hydraulic circuit side, a drain port (60d) which communicates with a drain side, a plunger (61) which controls the state of communication between the pressure regulating port and drain port, and a coil (70) which drives the plunger in accordance with an exciting current. The control device has a current generator (65) which supplies the coil with the exciting current corresponding to a duty signal; and a microcomputer (1). The microcomputer determines whether or not a preset foreign matter removal starting condition for removing foreign matter accumulated in the ports has been established. When the foreign matter removal starting condition is established, the microcomputer sets a variation pattern for a current command value in the form of a rectangular wave having a preset maximum current command value (A1) and a preset minimum current command value (A0), and transmit to the current generator a first duty signal corresponding to the maximum current command value and a second duty signal corresponding to the minimum current command value. The microcomputer further determines whether or not a preset foreign matter removal completion condition has been established. When the foreign matter removal completion condition is established, the microcomputer terminates the setting of the rectangular wave variation pattern.

11 Claims, 8 Drawing Sheets

LINEAR SOLENOID VALVE CONTROL DEVICE

FIELD OF THE INVENTION

This invention relates to the improvement of a linear solenoid valve used in a hydraulic device or the like. A transmission (for example, a belt continuously variable transmission) installed in a vehicle can be cited as an example of a hydraulic device.

BACKGROUND OF THE INVENTION

Figure 8:
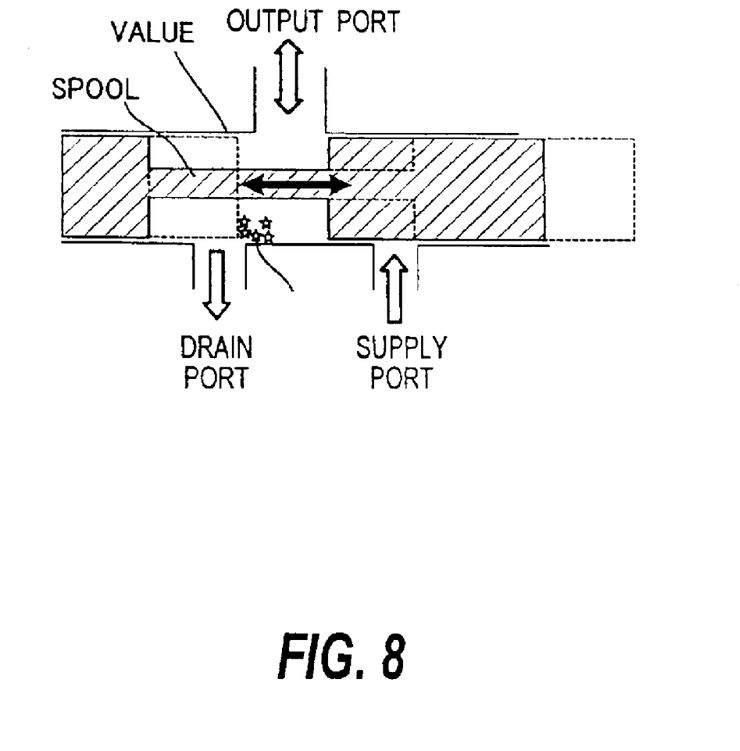
FIG. 8 is a schematic sectional view of a three-way linear solenoid valve of the prior art.

Japanese Patent No. 2836789 discloses a linear solenoid valve which regulates the oil pressure of a hydraulic device. This prior art employs a three-way linear solenoid valve in a hydraulic circuit which controls the line pressure of an automatic transmission. As shown in FIG. 8, the three-way linear solenoid valve comprises a spool enabling communication between a supply port and an output port/drain port. By raising an exciting current of a solenoid which drives the spool to a rated maximum value such that the drain port is opened widely, foreign matter (sludge and the like) which has accumulated around the drain port is removed by the hydraulic fluid flowing into the drain port.

Patent No. 2629512 discloses a linear solenoid valve used to control a lock-up clutch. In this prior art, control to remove foreign matter is performed only when the lock-up clutch is in a state of disengagement.

SUMMARY OF THE INVENTION

However, in the prior art of Japanese Patent No. 2836789, the supply port of the linear solenoid valve closes when the drain port is open. Hence, in order to create a flow for discharging foreign matter, control must be performed to remove the foreign matter after raising the oil pressure of the hydraulic circuit. During this control, the drain port is opened, and hence the oil pressure (hydraulic circuit pressure) on the output port side falls dramatically. Hence control to remove foreign matter can only be performed in limited conditions where reduced output pressure is permissible.

Particularly in a continuously variable transmission, in which speed-change control is performed by means of oil pressure, it becomes difficult to maintain the speed ratio when the oil pressure varies greatly, and hence the operating conditions in which the foreign matter removal control of this prior art is applicable are extremely limited.

Meanwhile, in the prior art in Patent No. 2629512, foreign matter removal control is performed when control of the linear solenoid valve is not necessary. Hence this prior art cannot be applied to a line pressure circuit or the like, which requires constant control.

It is therefore an object of this invention to remove foreign matter from a linear solenoid valve while avoiding dramatic decreases in the oil pressure of a hydraulic circuit and enabling control of the oil pressure at all times.

In order to achieve the above object, this invention provides a control device for controlling a two-way linear solenoid valve comprising a pressure regulating port which communicates with a hydraulic circuit side, a drain port which communicates with a drain side, a plunger which controls the state of communication between the pressure regulating port and drain port, and a coil which drives the plunger in accordance with an exciting current. The control device comprises a current generator which supplies the coil with the exciting current corresponding to a duty signal; and a microcomputer. The microcomputer is programmed to determine whether or not a preset foreign matter removal starting condition for removing foreign matter accumulated in the ports has been established and to set a variation pattern for a current command value in the form of a rectangular wave having a preset maximum current command value and a preset minimum current command value, when the foreign matter removal starting condition is established, and subsequently transmit to the current generator a first duty signal corresponding to the maximum current command value and a second duty signal corresponding to the minimum current command value. The microcomputer is further programmed to determine whether or not a preset foreign matter removal completion condition has been established and to terminate the setting of the rectangular wave variation pattern when the foreign matter removal completion condition is established.

The details as well as other features and advantages of this invention are set forth in the remainder of the specification and are shown in the accompanying drawings.

DESCRIPTION OF THE PREFERRED EMBODIMENTS

Figure 1:
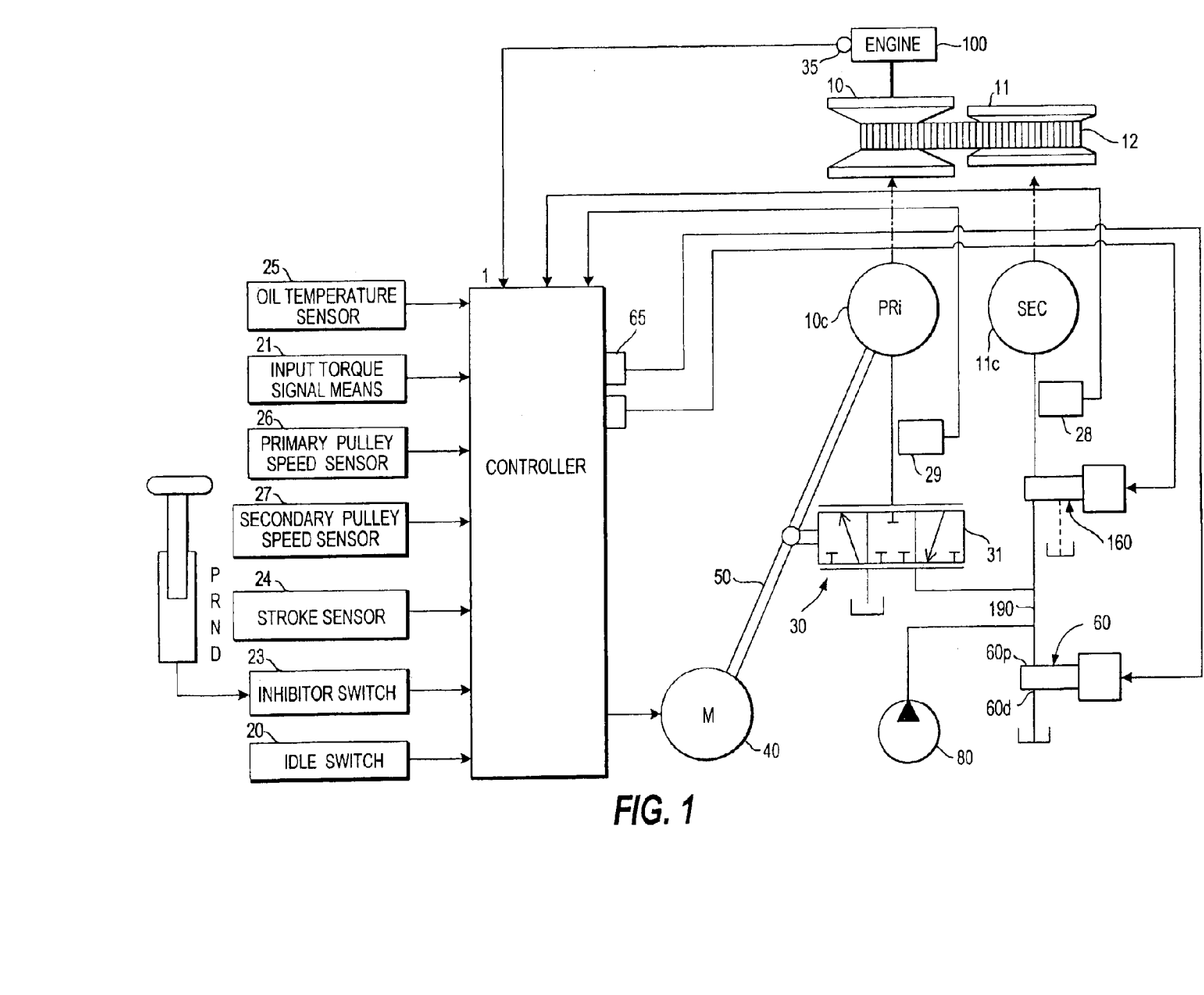
FIG. 1 is a schematic diagram of a continuously variable transmission, illustrating an embodiment of this invention.

FIG. 1 shows a schematic diagram of a continuously variable transmission of a vehicle to which this invention is applied.

The continuously variable transmission comprises a pair of variable pulleys constituted by an input shaft side primary pulley 10 and an output shaft side secondary pulley 11. The two variable pulleys 10, 11 are connected by a V-belt 12. The continuously variable transmission is connected to an engine 100.

A hydraulic control circuit controls the speed ratio of the continuously variable transmission (CVT) and the contact friction force of the V-belt in response to a command from a CVT controller 1. During normal control, the CVT controller 1 determines the speed ratio and contact friction force on the basis of an input torque signal 21 (engine torque) indicating the input torque to the CVT, which is transmitted from an engine controller (not shown) which controls the engine 100, and the output from sensors to be described below, and thus controls the oil pressure.

The groove width of the primary pulley 10 for supporting the V-belt 12 is controlled by oil pressure (primary pressure) which acts on a primary pulley cylinder chamber 10c. The groove width of the secondary pulley 11 for supporting the V-belt is variably controlled in accordance with the oil pressure (secondary pressure) which acts on a secondary pulley cylinder chamber 11c.

A hydraulic control circuit which controls the speed ratio of the continuously variable transmission and the contact friction force of the V-belt 12 comprises a regulator valve 60 which controls the line pressure, a speed change control valve 30 which controls the oil pressure (to be referred to as primary pressure hereinafter) of the primary pulley cylinder chamber 10c, and a pressure reducing valve 160 which controls the supply pressure (to be referred to as secondary pressure hereinafter) to the secondary pulley cylinder chamber 11c.

The speed change control valve 30 is connected to a servo link 50 which functions as a mechanical feedback mechanism, and is driven by a stepping motor 40 connected to one end of the servo link 50. Further, the speed change control valve 30 receives feedback regarding the groove width, or in other words the actual speed ratio, from a movable conical disc of the primary pulley 10, which is connected to the other end of the servo link 50.

A regulator valve 60 is constituted by a two-way linear solenoid valve which regulates oil pressure from a hydraulic pump 80. The regulator valve 60 regulates a line pressure PL in accordance with a command (for example, a duty signal or the like) from the CVT controller 1.

The line pressure PL is supplied to the speed change control valve 30 which controls the primary pressure, and the pressure reducing valve 160 comprising a solenoid, which controls the secondary pressure.

The stepping motor 40 controls the speed ratio between the primary pulley 10 and secondary pulley 11 in accordance with a speed change command signal from the CVT controller 1. A spool 31 of the speed change control valve 30 is driven in accordance with displacement of the servo link 50 in response to the stepping motor 40 receiving the speed change command signal. The line pressure PL supplied to the speed change control valve 30 is regulated and supplied to the primary pulley 10 as primary pressure. Thus the groove width is variably controlled and set to a width corresponding to a predetermined speed ratio.

The speed change control valve 30 performs intake and discharge of oil pressure to and from the primary pulley cylinder chamber 10c in accordance with the displacement of the spool 31, and thus regulates the primary pressure to a target speed ratio commanded by the driving position of the stepping motor 40. When the actual speed change is complete, the speed change control valve 30 receives the displacement of the servo link 50, whereby the spool 31 moves to a closed valve position.

The CVT controller 1 receives signals from a primary pulley speed sensor 26 which detects the rotation speed of the primary pulley 10, a secondary pulley speed sensor 27 which detects the rotation speed (corresponding to the vehicle speed and the output rotation speed of the transmission) of the secondary pulley 11, and an oil pressure sensor 28 which detects the secondary pressure acting on the cylinder chamber 11c of the secondary pulley. The CVT controller 1 also receives a primary pressure signal from an oil pressure sensor 29 which detects the primary pressure acting on the cylinder chamber 10c of the primary pulley, a range signal from an inhibitor switch 23 which operates in accordance with a select lever, a stroke signal (or an accelerator pedal travel) from a stroke sensor 24, corresponding to the operating amount of an accelerator pedal that is operated by a driver, a signal from an idling switch 20 which detects that the accelerator pedal is in a released state, and a signal indicating the oil temperature of the continuously variable transmission 5 from an oil temperature sensor 25. On the basis of these signals, the CVT controller 1 variably controls the speed ratio and the contact friction force of the V-belt 12. The select lever is used to select the operating range of the transmission, and accordingly, the range signal indicates the operating range of the transmission.

During normal control, the CVT controller 1 determines a target speed ratio according to the vehicle speed and accelerator pedal stroke, and then controls the actual speed ratio to the target speed ratio by driving the stepping motor 40. The CVT controller 1 controls the thrust of the primary pulley 10 and secondary pulley 11 (the contact friction force between the V-belt and the pulleys) in accordance with the input torque, the speed ratio, the oil temperature, the speed change velocity, and so on.

Figure 2:
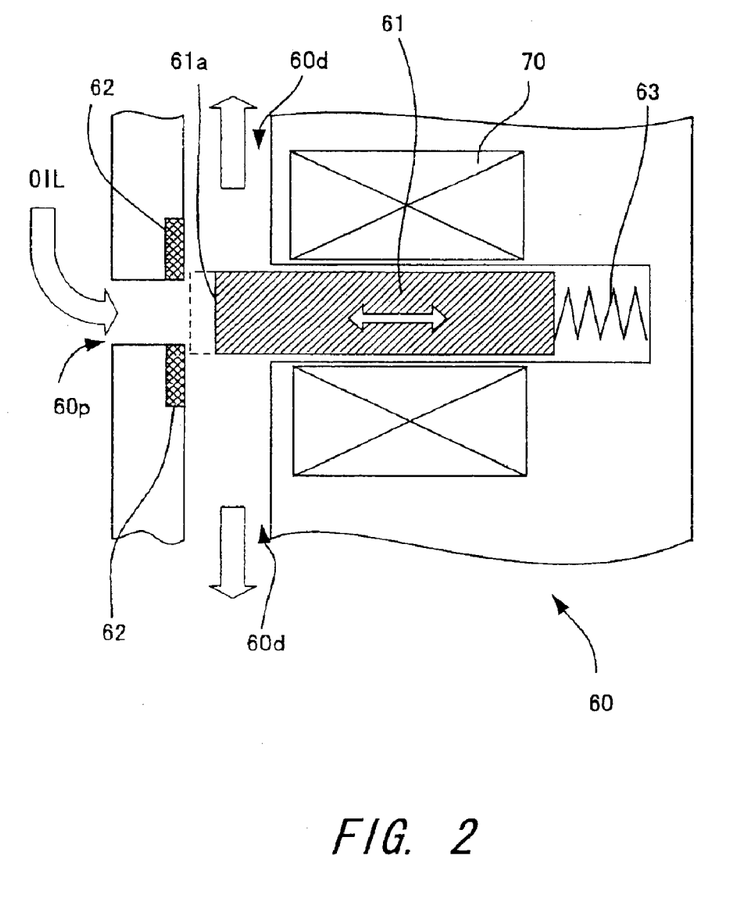
FIG. 2 is a schematic sectional view of a two-way linear solenoid valve.

Referring to FIG. 2, the regulator valve 60 constituted by a two-way linear solenoid valve will be described.

The regulator valve 60 comprises a pressure regulating port 60p which communicates with a line pressure circuit 190 to which the hydraulic pump 80 is connected, and a drain port 60d which communicates with a tank or drain. A seal 62 is provided on the peripheral portion of an opening of the pressure regulating port 60p facing the drain port 60d.

A plunger 61 of the two-way linear solenoid valve is capable of displacement in the axial direction. A position in which an end face 61a of a plunger 61 contacts the seal 62 signifies a closed state of the valve. In this state, communication between the pressure regulating port 60p and drain port 60d is blocked. On the other hand, when the end face 61a of the plunger 61 moves away from the seal 62, the pressure regulating port 60p and drain port 60d enter a state of communication (open valve state). The opening amount is defined by the gap between the end face 61a of the plunger 61 and the seal 62. The line pressure is regulated by controlling the opening amount.

An elastic member 63 (a spring or the like) which urges the plunger 61 toward the seal 62 is disposed on the other end of the plunger 61. The plunger 61 is displaced in the right direction in FIG. 2 in accordance with the exciting current of a coil 70 which wraps around the plunger 61. When the exciting current is zero, the stroke of the plunger 61 falls to zero, thereby causing a closed valve state in which the end face 61a abuts on the seal 62.

Figure 4:
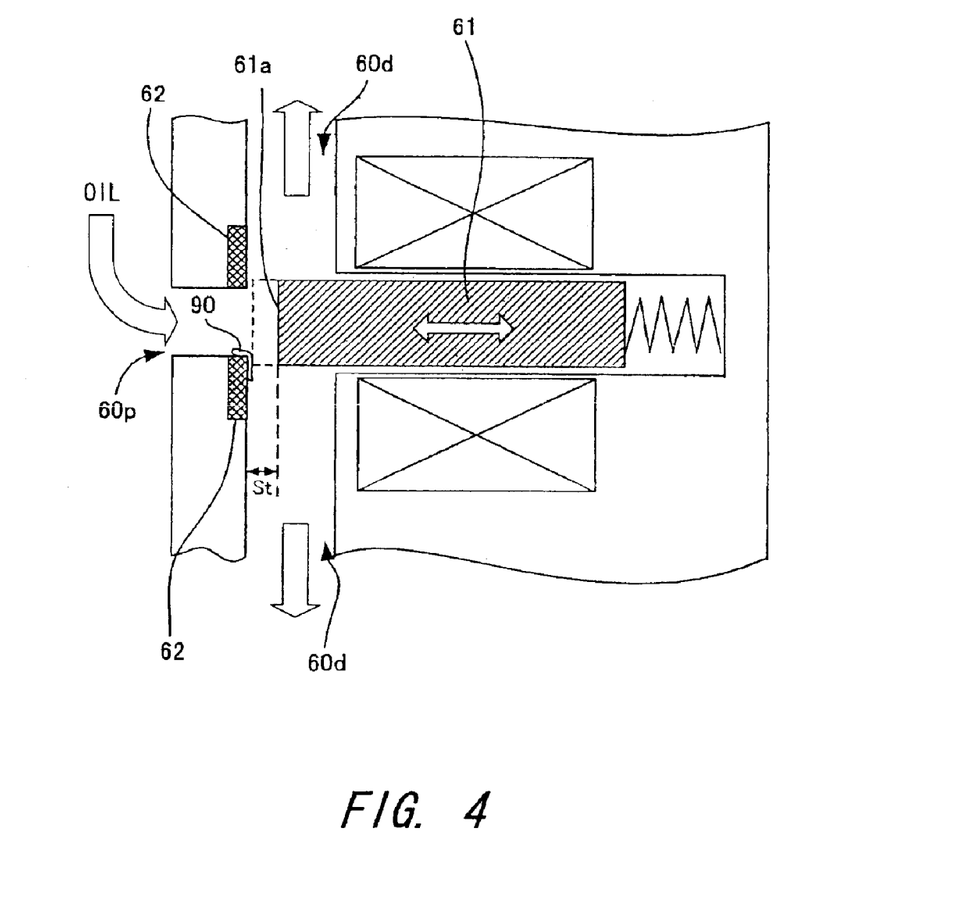
FIG. 4 is a schematic sectional view of the two-way linear solenoid valve having foreign matter trapped therein.

The plunger 61 is formed from a movable iron core which is attracted by the excitation of the coil 70. Accordingly, foreign matter such as iron particles easily become adhered to the periphery of the end face 61a facing the seal 62 and so on. As a result, this foreign matter 90 sometimes becomes trapped between the end face 61a of the plunger 61 and the seal 62 as shown in FIG. 4. Hence, when a predetermined condition is satisfied, the CVT controller 1 executes control to remove the foreign matter accumulated in the ports 60p, 60d from the regulator valve 60.

Figure 3:
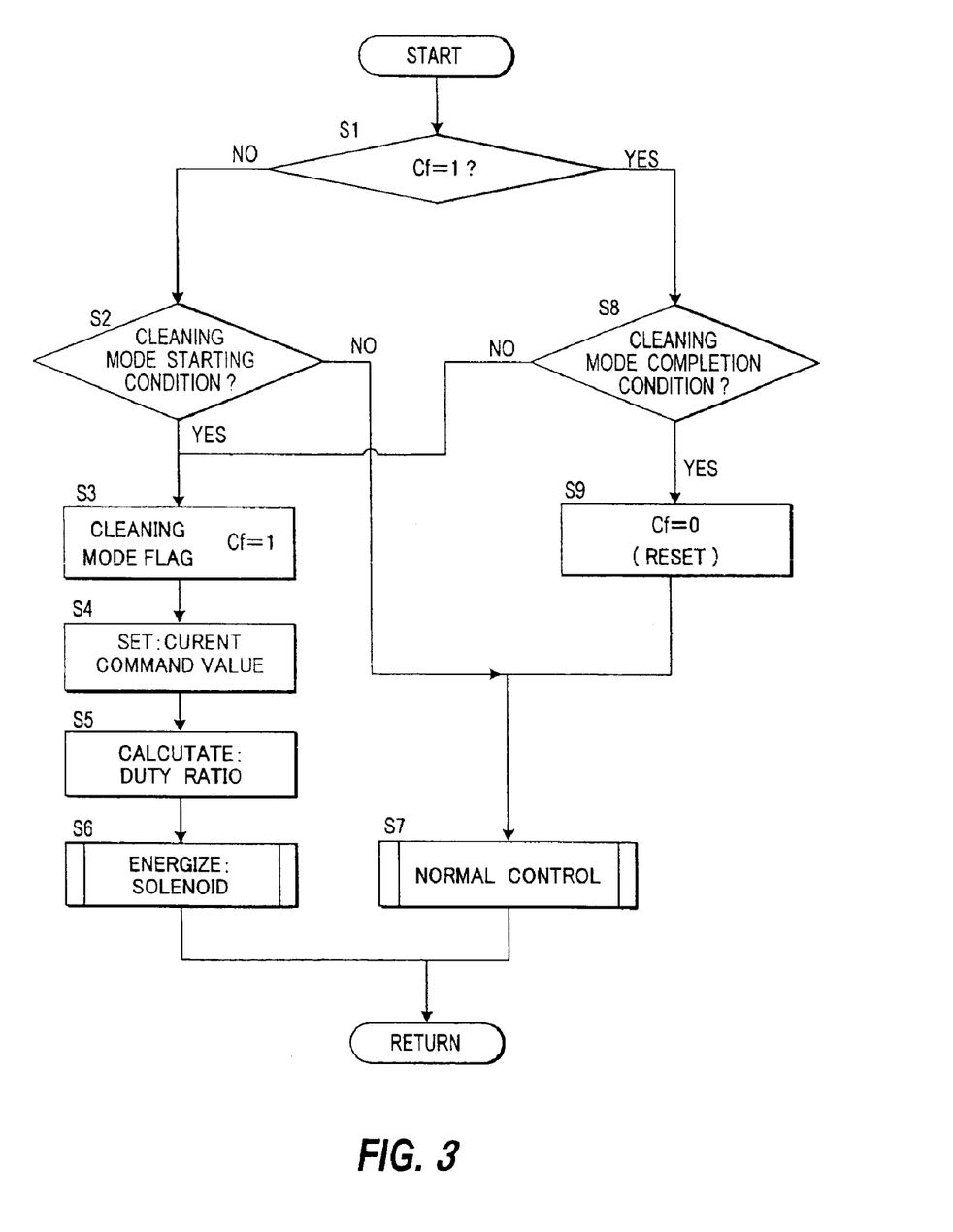
FIG. 3 is a flowchart illustrating an example of control performed by a controller.

Next, referring to the flowchart in FIG. 3, an example of a control routine relating to foreign matter removal (cleaning mode) control will be described. The control routine is executed in a predetermined cycle (of 10 msec, for example).

The CVT controller 1 is a microcomputer-based controller. The CVT controller 1 is constituted by a microcomputer comprising a central processing unit (CPU) which executes programs, read-only memory (ROM) which stores programs and data, random access memory (RAM) which stores calculation results of the CPU and obtained data temporarily, a timer which measures time, and an input/output interface (I/O interface). The control routine may be materialized as a program that is executed by the microcomputer.

First, in a step S1, a determination is made as to whether or not a cleaning mode flag Cf is at unity. When the cleaning mode flag Cf is at unity, this indicates that cleaning mode (foreign matter removal control) is underway, and when Cf=0, it indicates that normal control is underway.

When the cleaning mode flag Cf is at zero, the routine advances to a step S2. On the other hand, if the cleaning mode flag Cf is at unity, the routine advances to a step S8.

When the cleaning mode flag Cf is at zero, a determination is made in the step S2 as to whether or not a preset cleaning mode starting condition for removing foreign matter accumulated in the ports has been established.

The cleaning mode starting condition is that a predetermined shift operation be performed with a diagnostic device for the transmission connected to the CVT controller 1 in a maintenance shop or the like. For example, the starting condition is established when the engine 100 is started up with the diagnostic device connected, and the shift lever is operated in a sequence of P→R→N→R→P with the accelerator pedal in a released state (in other words, with the idling switch signal ON). Start-up of the engine may be detected on the basis of the engine rotation speed, detected by a crank angle sensor 35 of the engine 100, and an ON signal from a starting switch of a starter motor which cranks the engine. The engine rotation speed and the ON signal from the starting switch are transmitted to the CVT controller 1 from the engine controller.

Alternatively, the CVT controller 1 may monitor the secondary pressure detected by the oil pressure sensor 28 and the primary pressure detected by the oil pressure sensor 29, and start cleaning mode control when the primary pressure and secondary pressure fall below their respective target values. The reduction in the line pressure by cleaning mode control is small, corresponding to the length of the open valve period during which the end face 61a of the plunger 61 is removed from the seal 62, and hence an operation of the transmission is not obstructed. In this case, a cleaning mode completion condition of the step S8, to be described below, is established when the primary pressure and secondary pressure return within a predetermined range. It should be noted that the target values of the primary pressure and secondary pressure are set in accordance with the operating conditions of the transmission.

When the cleaning mode starting condition has been established, the routine advances to a step S3. When the cleaning mode starting condition is not established, the routine advances to a step S7. In the step S7, the regulator valve 60 is driven by means of normal control. During normal control, the regulator valve 60 may be driven on the basis of the input torque to the CVT.

In the step S3, the cleaning mode starting condition has been established, and hence the cleaning mode flag Cf is set to unity.

Next, in a step S4, a current command value is set for the intended exciting current to be supplied to the solenoid (coil 70) of the regulator valve 60. In this embodiment, the solenoid valve is energized by a pulse current, and hence the current command value indicates an average current value of the pulse current to be supplied to the solenoid.

As shown in FIG. 4, the current command value is set such that a process whereby the plunger 61 is displaced by a preset stroke St and then the end face 61a of the plunger 61 impinges on the seal 62 is performed repeatedly. In so doing, the foreign matter 90 that is trapped between the end face 61a of the plunger 61 and the seal 62 is removed by the flow of oil from the pressure regulating port 60p toward the drain port 60d.

Figure 5:
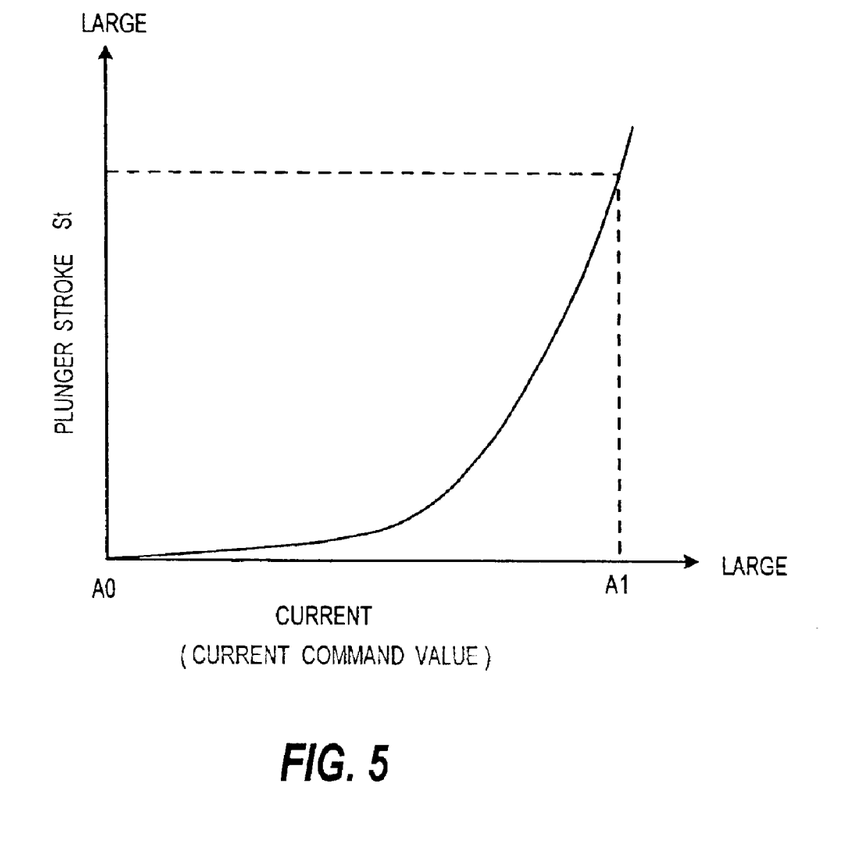
FIG. 5 is a map showing the relationship between a stroke of a plunger and a current command value of a coil.

FIG. 5 shows the relationship between the stroke St of the plunger 61 and the current command value. The stroke St required of the plunger 61 corresponds to a maximum value A1 of the current command value. The maximum value A1 of the current command value is set in advance in accordance with the envisaged size of the foreign matter, and stored in the memory. For example, the maximum value A1 is set to 800 [mA]. A minimum value A0 is set to a current command value of 0 [mA], which corresponds to the closed valve state in which the stroke St=0. It goes without saying that the maximum value A1 and minimum value A0 may be set to other values.

Figure 6:
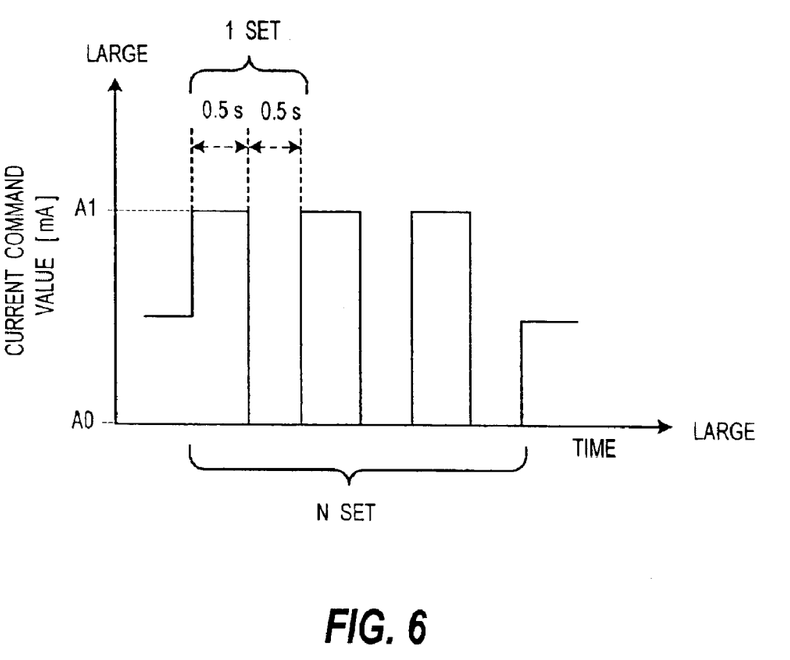
FIG. 6 is a graph showing a pattern of temporal variation in the current command value set by the controller.

As shown in FIG. 6, the driving pattern of the plunger 61 is set such that the maximum value A1 and minimum value A0 of the current command value alternate with each other for predetermined time periods. The driving pattern, or in other words the temporal variation pattern of the current command value, takes the form of a rectangular wave, and hence the maximum value A1 and minimum value A0 of the current command value are repeated cyclically. The holding time of the maximum value A1 and the holding time of the minimum value A0 are set to 0.5 seconds, for example. The duty factor of the current command value rectangular wave is fifty percent, but may be set at another value. In other words, the holding time of the maximum value A1 and the holding time of the minimum value A0 may differ from each other. If the maximum value A1 and minimum value A0 are considered as one set (one cycle), then N sets (N cycles) of the rectangular wave are set up to the establishment of the cleaning mode completion condition.

Figure 7:
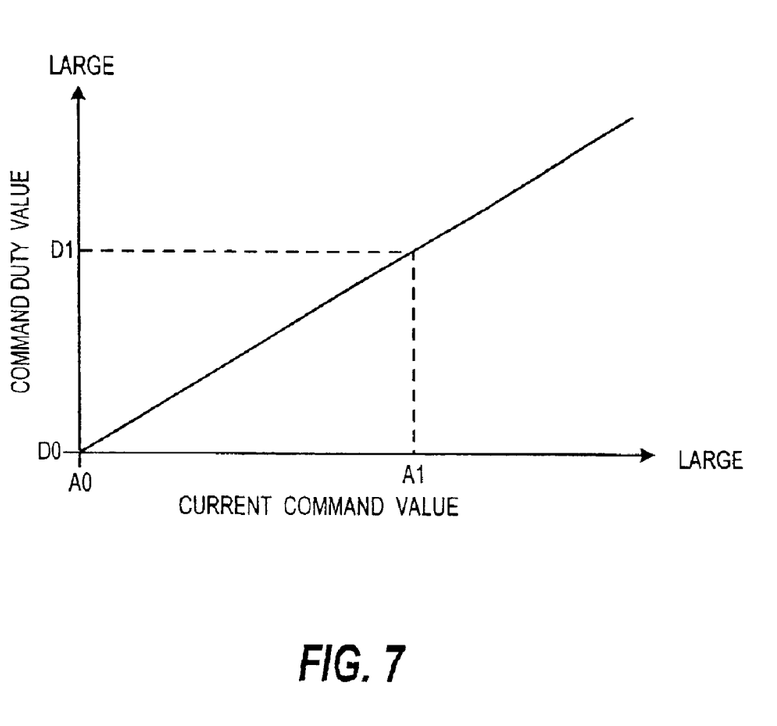
FIG. 7 is a map showing the relationship between the current command value and a command duty value.

Next, in a step S5, the duty ratio of the pulse current which energizes the coil 70 is set as a command duty value. As shown in FIG. 7, the command duty value is set in accordance with the current command value so that the average current supplied to the solenoid is changed by the duty ratio of the pulse current. The command duty value increases as the current command value increases. The CVT controller 1 generates a first duty signal having a duty ratio D1, which corresponds to the maximum current command value A1, and a second duty signal having a duty ratio D0, which corresponds to the minimum current command value A0, alternately in synchronization with the rectangular wave of FIG. 6.

In a step S6, the coil 70 is energized in accordance with the current command value variation of the rectangular wave set in the step S4, and thus the plunger 61 performs a reciprocating motion, whereby cleaning mode (foreign matter removal control) is begun.

More specifically, a duty signal having a command duty value is transmitted to a pulse current generator 65. For example, the pulse current generator 65 uses a transistor, which switches ON and OFF in accordance with the duty signal, to generate a pulse current for energizing the coil 70. Accordingly, the pulse current frequency (solenoid driving frequency) matches the frequency of the duty signal. The current generator supplies the coil alternately with a first exciting pulse current corresponding to the first duty signal and a second exciting pulse current corresponding to the second duty signal.

Normally, the frequency of the pulse current which energizes the coil 70 is a high frequency (800 [Hz], for example)

such that the plunger 61 does not respond to the pulse current, and hence the plunger 61 remains in the position of the stroke St corresponding to the current command value.

However, in order to increase the responsiveness of the plunger 61, the frequency of the exciting pulse current may be set to a low frequency (50–100 [Hz], for example) such that the plunger 61 is able to respond to the exciting pulse current. In this case, the plunger 61 oscillates (at 50–100 [Hz], for example) about the position of the stroke St corresponding to the current command value so that the foreign matter can be removed even when the current command value is fixed at the maximum value A1, and hence it is possible to strike the seal 62.

Meanwhile, when the cleaning mode flag Cf is at unity according to the determination in the step S1, the routine advances to the step S8, where a determination is made as to whether or not the cleaning mode completion condition has been established. For example, the completion condition is established when the range signal indicates a range other than the parking range (P), or when the idling switch signal is in an OFF state.

The cleaning mode completion condition (foreign matter removal control completion condition) may be established when a predetermined length of time (one second, for example) has passed after start-up of the engine. Cleaning mode may also be completed before this predetermined length of time has elapsed when the range signal indicates a traveling range (D range or R range), or the vehicle speed has substantially entered a traveling condition exceeding a predetermined value (5 km/h, for example). In the traveling ranges of the transmission, the rotation of the engine is transmitted to an output shaft (not shown) which is connected to the secondary pulley 11.

When the completion condition has been established, the routine advances to a step S9, where the cleaning mode flag Cf is reset to zero. Thereafter, the routine moves to the normal line pressure control (not cleaning mode) of the step S7.

When the completion condition is not established, on the other hand, the routine advances to the step S3, where cleaning mode is continued.

Next, the effects of this embodiment will be described.

According to the control described above, when the predetermined cleaning mode starting condition is established, variation in the current command value is provided as a rectangular wave in which the maximum value A1 and minimum value A0 are repeated alternately, and hence, as shown in FIG. 4, the plunger 61 performs a reciprocating motion in the axial direction between a closed valve position and a predetermined opening amount (the stroke St). As a result of this reciprocating motion, the end face 61a of the plunger 61 strikes the seal 62 repeatedly. The foreign matter 90 that is sandwiched between the end face 61a and seal 62 is struck by the end face 61a of the plunger 61, and is also pulled away from the seal 62 or end face 61a by the flow of oil from the pressure regulating port 60p toward the drain port 60d to be discharged to the tank side (drain side). The plunger 61 is closed periodically by the variation pattern of the rectangular wave form current command value, and hence the pressure regulating port 60p of the regulator valve 60 is prevented from being in constant communication with the drain port 60d. Thus reductions in oil pressure on the line pressure circuit 190 side (or hydraulic circuit side) are prevented.

When a two-way linear solenoid valve is used, oil pressure from the supply port is not blocked as occurs when the three-way linear solenoid valve of the prior art is used. Hence dramatic falls in oil pressure can be avoided even when performing the foreign matter removal control described above. It is therefore possible to perform the foreign matter removal control when the vehicle is operating normally.

Unlike the above embodiment, the cleaning mode starting condition may simply be that the engine is started. In other words, cleaning mode (foreign matter removal control) may be performed during engine start-up. In this case, the foreign matter removal control leads to a slight reduction in line pressure, but this does not hinder vehicle motion, and moreover, the regulator valve 60 is subjected to foreign matter removal control every time the engine is started. Reductions in oil pressure and the like caused when foreign matter becomes trapped can be forestalled, and hence the reliability of the hydraulic circuit can be improved.

In the embodiment described above, the regulator valve 60 which regulates the line pressure is constituted by a two-way linear solenoid valve, and foreign matter removal control is performed on the regulator valve 60. However, the pressure reducing valve 160 which regulates the secondary pressure may be constituted by a two-way linear solenoid valve such that foreign matter removal control is performed on the pressure reducing valve 160.

The entire contents of Japanese Patent Applications P2003-289159 (filed Aug. 7, 2003) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A control device for controlling a two-way linear solenoid valve comprising a pressure regulating port which communicates with a hydraulic circuit side, a drain port which communicates with a drain side, a plunger which controls the state of communication between the pressure regulating port and drain port, and a coil which drives the plunger in accordance with an exciting current, the control device comprising:

a current generator which supplies the coil with the exciting current corresponding to a duty signal; and a microcomputer programmed to:

determine whether or not a preset foreign matter removal starting condition for removing foreign matter accumulated in the ports has been established;

set a variation pattern for a current command value in the form of a rectangular wave having a preset maximum current command value and a preset minimum current command value, when the foreign matter removal starting condition is established, and subsequently transmit to the current generator a first duty signal corresponding to the maximum current command value and a second duty signal corresponding to the minimum current command value;

determine whether or not a preset foreign matter removal completion condition has been established; and terminate the setting of the rectangular wave variation pattern when the foreign matter removal completion condition is established.

2. The control device as defined in claim 1, wherein the linear solenoid valve comprises a seal member around a drain port side opening portion of the pressure regulating port, to and from which an end face of the plunger is connected and disconnected, the plunger performing a reciprocal motion in the axial direction thereof according to the setting of the variation pattern of the rectangular wave form current command value, whereby the seal member and the end face of the plunger are connected and disconnected, the pressure regulating port and the drain port communicating with each other or being blocked from each other in accordance with the connection or disconnection.

3. The control device as defined in claim 2, wherein the maximum current command value is a value at which the end face of the plunger is removed from the seal member by a predetermined amount enabling the removal of foreign matter, and wherein the minimum current command value is a value at which the end face of the plunger contacts the seal member.

4. The control device as defined in claim 1, wherein the two-way linear solenoid valve is used in a transmission connected to an engine, the control device comprises means for detecting start-up of the engine, and the foreign matter removal starting condition is the start-up of the engine.

5. The control device as defined in claim 4, wherein the foreign matter removal completion condition is the elapse of a predetermined amount of time following the start-up of the engine.

6. The control device as defined in claim 4, wherein the control device comprises means for detecting an operating range of the transmission, and wherein the foreign matter removal completion condition is established when the operating range of the transmission is in a traveling range, in which the transmission outputs a rotation of the engine.

7. The control device as defined in claim 4, wherein the control device comprises a sensor which detects an output rotation speed of the transmission, and wherein the foreign matter removal completion condition is established when the output rotation speed of the transmission is equal to or greater than a predetermined value.

8. The control device as defined in claim 1, wherein the two-way linear solenoid valve is used in a belt continuously variable transmission connected to the engine, the control device comprises a sensor which detects a primary pressure acting on a primary pulley of the continuously variable transmission, and the foreign matter removal starting condition is a reduction in the primary pressure below a target value.

9. The control device as defined in claim 1, wherein the two-way linear solenoid valve is used in a belt continuously variable transmission connected to the engine, the control device comprises a sensor which detects a secondary pressure acting on a secondary pulley of the continuously variable transmission, and the foreign matter removal starting condition is a reduction in the secondary pressure below a target value.

10. A control device for controlling a two-way linear solenoid valve comprising a pressure regulating port which communicates with a hydraulic circuit side, a drain port which communicates with a drain side, a plunger which controls the state of communication between the pressure regulating port and drain port, and a coil which drives the plunger in accordance with an exciting current, the control device comprising:

current generating means for supplying the coil with the exciting current corresponding to a duty signal;

determination means for determining whether or not a preset foreign matter removal starting condition for removing foreign matter accumulated in the ports has been established;

setting means for setting a variation pattern for a current command value in the form of a rectangular wave having a preset maximum current command value and a preset minimum current command value, when the foreign matter removal starting condition is established;

transmission means for transmitting to the current generating means a first duty signal corresponding to the maximum current command value and a second duty signal corresponding to the minimum current command value;

determination means for determining whether or not a preset foreign matter removal completion condition has been established; and termination means for terminating the setting of the rectangular wave variation pattern when the foreign matter removal completion condition is established.

11. A control method for controlling a two-way linear solenoid valve comprising a pressure regulating port which communicates with a hydraulic circuit side, a drain port which communicates with a drain side, a plunger which controls the state of communication between the pressure regulating port and drain port, a current generator which supplies a coil with an exciting current corresponding to a duty signal, and the coil which drives the plunger in accordance with the exciting current, the control method comprising the steps of:

determining whether or not a preset foreign matter removal starting condition for removing foreign matter accumulated in the ports has been established;

setting a variation pattern for a current command value in the form of a rectangular wave having a preset maximum current command value and a preset minimum current command value, when the foreign matter removal starting condition is established, and subsequently transmitting to the current generator a first duty signal corresponding to the maximum current command value and a second duty signal corresponding to the minimum current command value;

determining whether or not a preset foreign matter removal completion condition has been established; and terminating the setting of the rectangular wave variation pattern when the foreign matter removal completion condition is established.

* * * * *